United States Patent [19]
Ambrosini

[11] 3,988,659
[45] Oct. 26, 1976

[54] MERIDIAN SEEKING INSTRUMENT
[75] Inventor: Leonard R. Ambrosini, Arlington, Va.
[73] Assignee: Lear Siegler, Inc., Santa Monica, Calif.
[22] Filed: June 19, 1972
[21] Appl. No.: 263,928

Related U.S. Application Data
[63] Continuation of Ser. No. 882,002, Dec. 4, 1969, which is a continuation of Ser. No. 529,325, Feb. 23, 1966, Pat. No. 3,512,264.

[52] U.S. Cl............................ 318/648; 318/624; 318/623; 33/324; 33/275 G
[51] Int. Cl.² ........................................ B64C 17/02
[58] Field of Search ........... 318/624, 623, 648, 649; 33/275 G, 324, 325, 326

[56] References Cited
UNITED STATES PATENTS
3,172,213  3/1965  Eklund............................. 33/275 G
3,275,268  9/1966  Auld, Jr........................... 318/624 X
3,577,646  5/1971  Eklund............................. 33/324 X OTHER PUBLICATIONS
Davis's; "Manual of Magnetism"; published in 1842 by Daniel Davis, Jr.; pp. 130–133.
Prescott; "Dynamo–Electricity"; D. Appleton & Co. N.Y., NY, 1884; pp. 815–820.
"Control System Design", Savant, McGraw Hill, 2nd Ed., 1964, pp. 240–247.

Primary Examiner—T. E. Lynch
Attorney, Agent, or Firm—Jackson & Jones

[57] ABSTRACT
A gyroscope unit having a horizontal spin axis hangs from a suspension band within a container. The container is rotatably supported about a vertical axis. A transducer generates a control signal representative of the angular displacement between the gyroscope unit and the container about the vertical axis from a reference position. The container is rotated about the vertical axis responsive to the control signal to reduce the angular displacement from the reference position. A torque about the vertical axis that opposes the angular displacement is directly applied to the gyroscope unit responsive to the control signal. The directly applied torque is a nonlinear function of the angular displacement, being zero below a threshold value of angular displacement and having a predetermined gradient above the threshold value.

9 Claims, 3 Drawing Figures

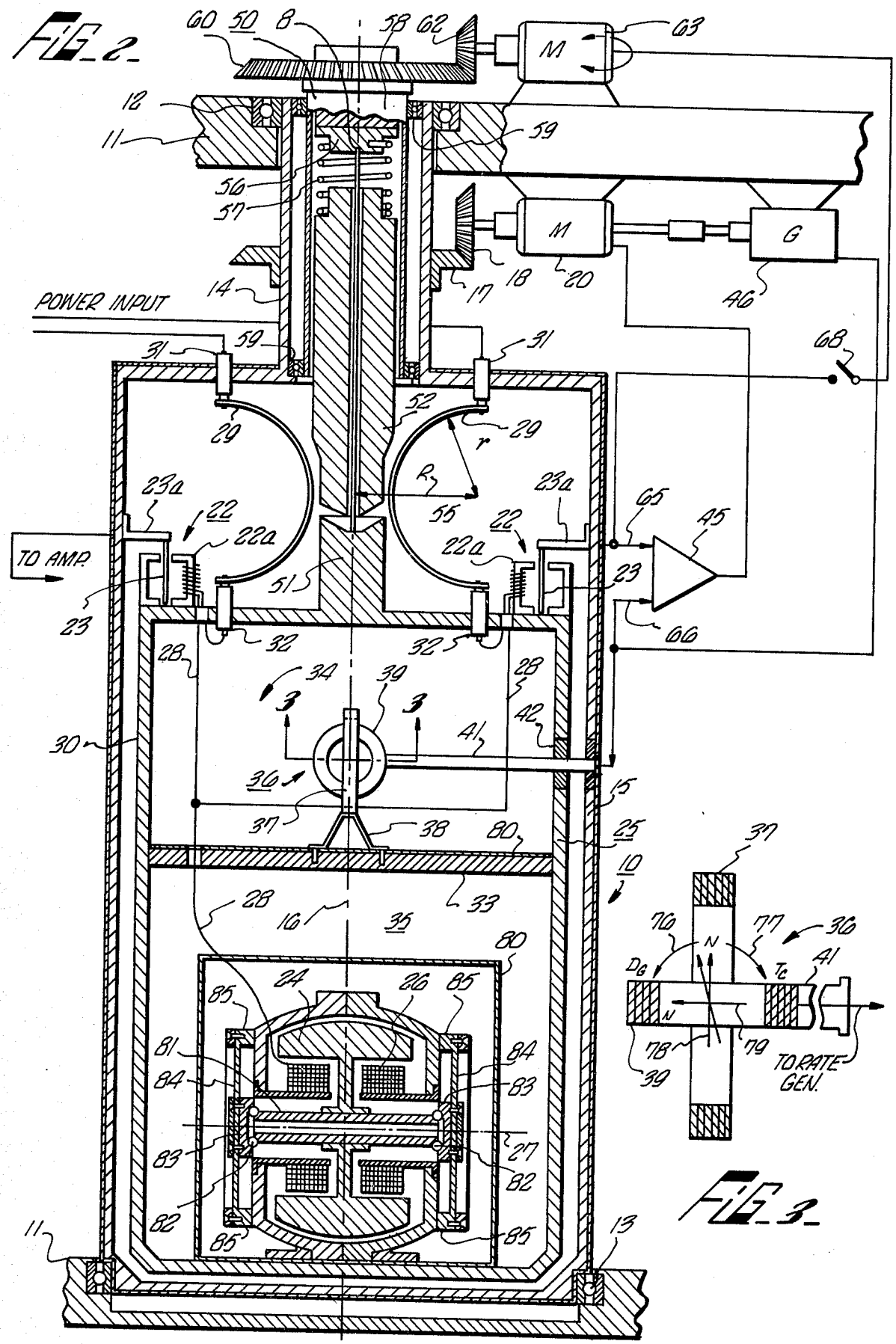

MERIDIAN SEEKING INSTRUMENT

CROSS REFERENCE TO RELATED APPLICATONS

This is a continuing application of a copending, commonly owned application, Ser. No. 882,002, filed Dec. 4, 1969, which in turn is a continuing application of application Ser. No. 529,325, filed Feb. 23, 1966 and now U.S. Pat. No. 3,512,264, of Leonard R. Ambrosini, issued May 19, 1970, the disclosure of which is incorporated herein by reference.

BACKGROUND OF THE INVENTION

This invention relates to meridian seeking gyroscopic instruments and, more particularly, to an effective damping arrangement for such an instrument.

H. N. Eklund Reissue U.S. Pat. No. 26,370, which issued Apr. 9, 1968, discloses a meridian seeking instrument comprising a gyroscope unit hanging in a container from a thin suspension band. The suspension band supports the gyroscope unit so it is able to rotate about a vertical axis relative to the container. However, the suspension band exerts a restoring torque on the gyroscope unit responsive to the angular displacement of the gyroscope unit about the vertical axis from a reference position relative to the container. The gyroscope unit has a horizontal spin axis that tends to align itself with the meridian. The container is rotatably supported about the vertical axis. A transducer generates a control signal representative of the angular displacement between the ggyroscope unit and the container about the vertical axis from the reference position. A motor rotates the container about the vertical axis responsive to the control signal so as to reduce the angular displacement from the reference position. Thus, as the gyroscope unit aligns itself with the meridian the container follows it and untwists the suspension band.

Ideally, the gyroscope unit would be completely unconstrained by the suspension band as it moves about the vertical axis under the influence of the earth's spin. Accordingly, from the point of view of accuracy of the instrument, it is desirable for the torsional spring constant of the suspension band, i.e., the ratio of restoring torque to angular displacement, to be as small as practicable. However, the suspension band is the only effective means for dissipating the rotational energy of the gyroscope unit about the vertical axis. Accordingly, from the point of view of restraining the oscillations of the gyroscope unit about the vertical axis, it is desirable for the torsional spring constant of the suspension band to be as large as practicable. Thus, in selecting the torsional spring constant for the suspension band a compromise must be struck between accuracy and damping.

SUMMARY OF THE INVENTION

The invention contemplates the direct application of a torque about the vertical axis to the gyroscope unit. This torque opposes the angular displacement between the gyroscope unit and the container from the reference position and thereby damps the oscillations of the gyroscope unit. In effect, the directly applied torque augments the torsional spring constant of the suspension band, i.e., stiffens it, as to restrain without adversely affecting the accuracy of the instrument. Thus, high accuracy and damping can both be achieved by selecting a suspension band with an actual torsional spring constant that is as small as practicable.

An important feature of the invention is the use of the same control signal that rotates the container to generate the directly applied torque. A first coil of a torquer is fixed to the gyroscope unit and a second coil of the torquer is fixed to the container. The control signal is applied to the second coil and a torque proportional thereto is coupled by the first coil to the gyroscope unit.

Another important feature of the invention is the use of a directly applied torque that is a nonlinear function of the angular displacement between the gyroscope unit and the container from the reference position. The ratio of the directly applied torque to the angular displacement is larger for large angular displacements than for small angulara displacements. Preferably, the ratio is zero below a predetermined threshold value of displacement and a predetermined constant above the threshold value. In other words, there is only a directly applied torque while the angular displacement between the gyroscope unit and the container is large. As a result, the only influence on the gyroscope unit when it is near the meridian is exerted by the suspension band and the earth's spin itself.

BRIEF DESCRIPTION OF THE DRAWINGS

The features of a specific embodiment of the best mode contemplated of carrying out the invention are illustrated in the following drawings in which

FIG. 2 is a side elevation of the meridian seeking instrument; and

FIG. 3 is a cross sectional view of the torquer device.

DETAILED DESCRIPTION OF THE SPECIFIC EMBODIMENT

Figure 1:
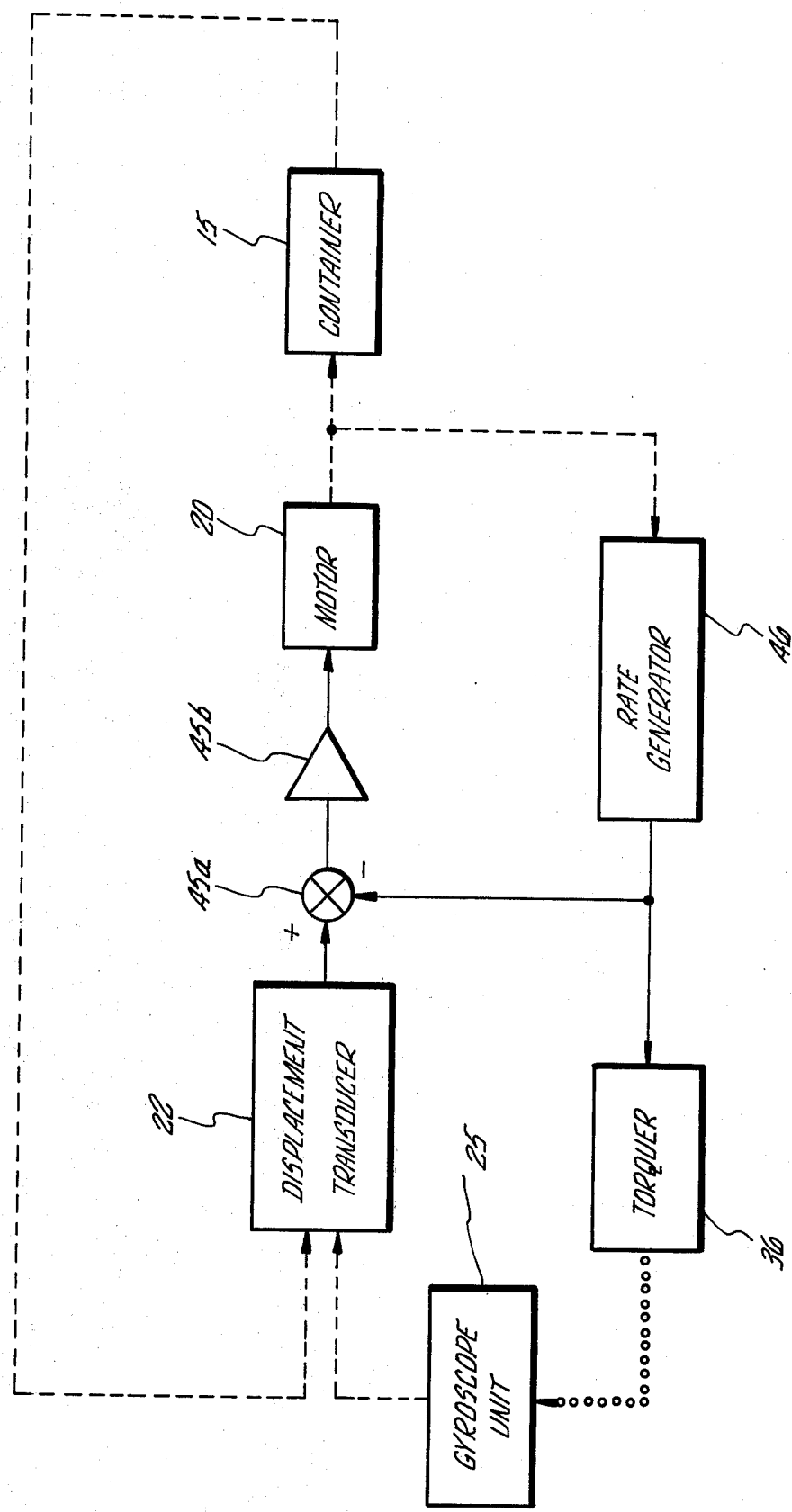
FIG. 1 is a block schematic diagram of a meridian seeking instrument incorporating the principals of the invention.

The disclosure of the cross-referenced Ambrosini patent is incorporated herein by reference.

Turning now to FIG. 2, a side elevation partially broken away of the meridian-seeking instrument 10, is shown. Instrument 10 is encased by a case 11 mounted on a tripod (not shown). The tripod is fastened to case 11 along axes which intersect at the suspension point 8 for pendulous gyroscope unit 25 of FIG. 2. Any vibration which may shake instrument 10 does not move suspension point 8 from its initial position.

Case 11 is only partially shown in FIG. 2 as having upper and lower bearings pairs 12 and 13 mounted in case 11 and coupled to a cylindrical outer container 15. These bearings are low friction, and in a well-known manner allow the outer container 15 to freely rotate about a centrally-located veretical axis 16. Rotation of outer container 15 about vertical axis 16 may be achieved through the horizontal oriented bevel gear 17 which is coupled to the outer container 15, and which is engaged by a bevel gear 18, driven by motor 20.

Located within the outer container 15 is a pendulous gyroscope unit 25. This pendulous gyroscope unit 25 includes an encased stator 26 which spins a pyro wheel or rotor 24, at very high speeds about a horizontal spin axis 27. The electrical power to drive this gyro wheel 24 is supplied by power leads 28 connecting stator 26 to a pair of curved power bands 29 through insulated terminals 32 mounted in openings located in the top of a cylindrical inner container 30. These curved power bands 29 are spring-load and are electrically connected at a second pair of insulated terminal posts 31 located in openings in the top of outer container 15.

Mounted on the top of the inner container 30 are a pair of pick-offs 22. Each pick-off consists of a double gap magnet 22a having a round, or square, coil 23 positioned in the air gap. Coil 23 is held in position in the air gap by a bracket 23a fastened to the inside of the outer container 15. The pick-offs 22 are wound with an energized coil in such a manner that if the sensing coil 23 deviates from the center of the gap of the magnet an electro-motive force is developed in the sensing coils 23 and a pick-off error signal is generated. An electrical connection is made between the coil 23 and amplifier 45 to apply this error signal to amplifier 45. Only one pick-off, of course, would be sufficient; however, two are used to provide greater magnitude of signal and to maintain accurate balance for the suspension system of gyroscope unit 25.

Inner container 30 of gyroscope 25 is divided into upper and lower chambers 34 and 35 respectively by a cylindrical partition wall 33. These two chambers are designated as the rotor chamber 35 and the torquer chamber 34. These chambers, and container 15 as well, may be filled with any suitable gas. A torquer 36, located in the torquer chamber 34, is mounted with an outer annular coil ring 37 fixedly fastened by bracket 38 to partition wall 33. Within the opening in annular coil 37 is a similar annular coil 39, which has its vertical plane transversely oriented to the vertical plane of annular coil 37. This inner annular 39 has an outer diameter slightly less than the inner diameter of the annular coil 37 and thus is free to move relative to coil 37. Coil 39 is permanently mounted by a bracket 41 to the inside surface of the outer container 15. Bracket 41 has an opening extending through its length for housing electrical leads between coil 39, aamplifier 45, and rate generator 46. A suitable opening 42 is provided in the inner container 30 so that the bracket 41 is allowed freedom of angular movement about the vertical axis 16 when there is relative movement between the inner and outer containers 30 and 15 respectively.

As shown in FIG. 2 the pendulous gyroscope unit 25 is in an uncaged position in that the caging piston 52 is not in contact with the similarly shaped caging seat 51 located at the top, and forming part of, the inner container 30.

A thin suspension band 55 is fastened to the caging seat 51 at one end, and at the other end band 55 is appropriately fastened to a suspension point disk 56 supported on a cylindrical spring 57. A longitudinal opening for suspension band 55 is provided along the length of piston 52 in the caging mechanism 50. This piston 52 is provided at its upper end with an offset shoulder, as is suspension point disk 56, so as to securely seat spring 57. Surrounding disk 56, spring 57, and piston 52 is a cylindrical piston chamber 58 which is mounted on bearings 59 for rotational movement about the vertical axis 16 relative to the inner wall of neck 14 of outer container 15. Piston 52 is allowed vertical movement within chamber 58 in response to any suitable lever or solenoid operation not shown but as is well known. Piston chamber 58, FIG. 2, extends through an opening in neck 14 of outer container 15, and a second horizontally oriented bevel gear 60 is suitably fastened to piston chamber 58. Gear 60 is engaged with a bevel gear 62 that in turn is driven by a motor 63.

Amplifier 45 as illustrated in FIG. 2, may be any suitable high impedance input amplifier. Inputs 65 and 66 are provided for amplifier 45. Input 65 applies the pick-off signals to amplifier 45 and input 66 applies the output from rate generator 46 to amplifier 45. The rate generator 45 of FIG. 2 is mechanically coupled to the servo motor 20. The pick-off error signals are also applied through a manually-operative calibrate switch 58 to calibrate motor 63.

When gyroscope 25, FIG. 2, is uncaged, the gyroscope spin axis 27 commences to precess about the vertical axis 16. This precessing or rotational movement twists the suspension band 55 a small amount. In its initial condition the pick-off coils 23 were positioned in the center of the electromagnets 22a and thus no signal is initially developed by the pick-offs 22. Precessing movement of the gyroscope 25, however, displaces the pick-off coils 23 slightly with respect to their initial position in the electromagnets 22a and an error signal is generated in coils 23. This error signal is proportional to the angular difference beetween the outer container 15 and the inner container 30. This error signal is applied to lead 65 which is one input for amplifier 45. The amplified signal from amplifier 45, in turn, drives the servo motor 20 which motor creates a torque that is sufficient to drive the outer container 15 into substantial alignment with the inner container 30.

This technique thus provides a follow-up system in that the outer container 15 is constrained to follow the movements of the inner container 30. Of course, the movements of the inner container 30 are in turn caused by the precessing movements of the pendulous gyroscope unit 25 in its attempts seek out the true north-/south meridian. Accordingly, the outer container 15 follows the movement of the spin axis 27 of the gyroscope unit 25 as it moves about the vertical axis 16. Connected to motor 20 is a rate generator 46 of any type well known in the art. This rate generator 46 is driven by the electrical motor 20 and produces an electrical output signal which is proportional to the speed, or rate, of rotation of the motor 20. This electrical output from the rate generator 46 is in turn applied to the torquer unit 36 which is located in torquer compartment 34 of the pendulous gyroscope unit 25.

Reference to FIG. 3 shows a horizontal cross-section of torquer 36. In FIG. 3 arrow 76' labeled $D_g'$ represents the angular displacement of the gyroscope unit 25 as the gyroscope spin axis 27 moves toward the north-south meridian. The output of the rate generator 46 delivers an electrical signal to the torquer 36 which produces a torque on the inner container 30 which opposes the angular displacement $D_g$. This countertorque is shown by arrow 77 which is labeled $T_c$. The manner in which this countertorque $T_c$ is produced is depicted in FIG. 3, wherein annular magnetic coils 37 and 39 are shown in cross-section and transversely oriented with respect to each other. Annular coil 37 is mounted on the partition wall 33 and thus is permanently fixed with respect to the inner container 30. The magnetic field established by coil 37 is shown by arrow 78. It should be understood that this magnetic field may be caused either by direct or alternating current in coil 37, depending upon the power input source. In any event, however, at any given moment of tiime the magnetic field 78 established by coil 37 may be approximately in the direction shown. Coil 39 which is permanently fixed by bracket 41 to the outer container 15 is at any same given moment in the direction shown by arrow 79. Coils 37 and 39 are thus wound so that the north and south poles of the magnetic fields 78 and 79 are 90° apart. A movement of the gyroscope unit 25 in the direction shown by torque arrow 76 tends to move the magnetic field 78 into the counterclockwise position shown in FIG. 3. The output signal from rate generator 46 is applied of proper phase (AC) or polarity (DC) to coil 39 so as normally to increase the strength of the magnetic field 79. Inasmuch as like magnetic poles tend to repel each other, this increased strength opposes the movement of coil 37 and because of the interrelationship between the two coils establishes a countertorque. Thus $T_c$ is continually being applied to oppose the annular displacement $D_a$ of the gyroscope unit 25 as it seeks out the true north/south meridian.

Referring to FIG. 1 disclosing the present invention, the solid lines connecting the blocks in the drawing represent the coupling of electrical signals, the dashed lines represent the coupling of angular displacement, and the dotted line represents the coupling of torque. The angular displacement of container 15 and hydroscope unit 25 about the vertical axis of the instrument is coupled to displacement transducer 22. Thus, displacement transducer 22 generates an electrical control signal representative of the angular displacement between gyroscope unit 25 and container 15 from a null position. The output of transducer 22 is electrically coupled to one input of a summing junction 45a. The output of summing junction 45a is electrically coupled through high gain amplifier 45b to the input of motor 20. In the cross referenced application, summing junction 45a and amplifier 45b are represented by a single element. The output shaft of motor 20 is mechanically coupled to container 15, which is rotatably supported about the vertical axis, and to rate generator 46. Rate generator 46 produces an electrical signal that is representative of the rate of change of the angular displacement of the output shaft of motor 20. The output of rate generator 46 is electrically coupled to the other input of summing junction 45a, where it is differentially combined with the output of transducer 22 as depicted by the mathematical signs in the drawing.

The control signal generated by transducer 22 drives container 15 through motor 20 so that the angular displacement between gyroscope unit 25 and container 15 is reduced toward zero. The output of rate generator 46 serves as a damping component for this followup servo system.

Motor 20 inherently functions as an integrator, i.e., the position of its output shaft is representative of the integral of the electrical signal applied to its input. Motor 20, as all motors, also has a threshold below which it does not respond, i.e., if the signal applied to its input is below a predetermined threshold level, the position of its output shaft remains stationary. Assuming that the signal applied to the input of motor 20 is above the threshold level, the output of rate generator 45 is proportional to the control signal generator by transducer 22 because this control signal is in essence first integrated and then differentiated.

The output of rate generator 46 is also applied to the input of torquer 36. Torquer 36 applies directly to gyroscope unit 25 about the vertical axis a torque that is proportionaal to the output of rate generator 46. This directly applied torque opposes the angular displacement between gyroscope unit 25 and container 15 from the reference position and tends to rotate gyroscope unit 25 to reduce this angular displacement. In summary, responsive to the control signal generated by transducer 22, container 15 is rotated by the described follow-up servo system and simultaneously therewith an opposing torque is directly applied to gyroscope unit 25. Preferably, the torque that is directly applied to gyroscope unit 25 by torquer 36 is proportional to the control signal generated by transducer 22. However, the term "responsive to the control signal" is used in this specification to include arrangements in which the torque 1 directly applied to gyroscope unit 25' is also proportional to the first or a higher order derivative of the control signal or other function thereof.

In the arrangement shown in the drawing, torquer 36 is only energized when the control signal generated by transducer 22 is above a predetermined threshold value, which is determined by the threshold of motor 20. Therefore, torquer 36 is only effective to damp gyroscope unit 25 prior to the time that it settles down. When gyroscope unit 25 is very close to the meridian, therefore, torquer 36 exerts no influence on it. In essence, the torque directly applied to gyroscope unit 25 is a nonlinear function of the angular displacement between gyroscope unit 25 and container 15, being zero below a predetermined threshold value and having a predetermined gradient above the threshold value. Alternatively, it would be possible to provide a different nonlinear characterestic for the torque directly applied to gyroscope unit 25. For example, the ratio of this torque to the angular displacement could increase continuously as a function of angular displacement.

Although it is preferable to apply the output of rate generator 46 to torquer 36, as shown in the drawing, in order to utilize the threshold of motor 20 in directly applying torque to gyroscope unit 25, it is also within the contemplation of the invention to apply to torquer 36 the output of transducer 22 or another transducer that generates a control signal representative of the angular displacement between the gyroscope unit and the container about the vertical axis from the reference position.

What is claimed is:

1. A two-degree-of-freedom meridian seeking system including a pendulously supported gyroscope having a predetermined null position relative to a gyroscope container, the gyroscope is pendulously supported for two-degree-freedom-of-movement by a suspension band and further including means rotatably mounting the container on a frame for rotation about a vertical axis, which container surrounds the suspended gyroscope unit and also includes means for generating an electrical control signal which is representative of an angular displacement relative to a null position, which displacement is caused by rotational movement about the vertical axis between the gyroscope unit and the container, said system comprising:

first magnetic means fixed to the gyroscope unit for supplying a first reference magnetic field perpendicular to the vertical axis;

second magnetic means fixed to the container and interspaced in nontouching relationship from the first magnetic means for supplying a second magnetic field perpendicular to the vertical axis and inductively coupled in substantially a perpendicular direction with the first reference magnetic field when there is, about the vertical axis, no angular displacement of the gyroscope unit away from said null position; and means responsive to said angular displacement electrical control signal for establishing a variable intensity in said second magnetic field which develops a torque when the gyroscope is displaced from the null position tending to move the gyroscope unit about the vertical axis and back to said null position.

2. A system in accordance with claim 1 wherein the interspaced magnetic means are a pair of physically spaced toroidal windings with one toroidal winding located within the other.

3. A system in accordance with claim 2 and further comprising means for mounting the first toroidal winding of said pair with an axis through its center perpendicular to the vertical axis, and means for mounting the second toroidal winding of said pair with an axis through its center transverse to the other center axis and also perpendicular to the vertical axis.

4. A system in accordance with claim 2 where the means for generating said electrical control signal representative of angular displacement includes a displacement transducer and a high gain amplifier.

5. A system as in claim 4 where the meridian seeking instrument further includes:
a rate generator for emitting an electrical signal that is a non-linear function of the angular displacement of the gyroscope unit from the null position;
a motor connected to the container for rotation of the container and the rate generator;
first means applying the output of the high gain amplifier to the motor, and
second means applying the output signal from the rate generator to the second magnetic means.

6. A meridian seeking system having a frame and a container rotatably mounted in the frame about a vertical axis with a gyroscope unit located within the container having a horizontal spin axis that tends to align itself with the meridian, comprising:
a member located above the gyroscope unit and supported such that it is rotatable about the vertical axis relative to the container;
means including a suspension band connected at the top to said member and connected at the bottom to the gyroscope unit for pendulously supporting the gyroscope unit so it is able to rotate about the vertical axis relative to the container;
a transducer for producing a control signal related to the angular displacement from the reference position between the gyroscope unit and the container;
a calibration switch;
means for rotating the container in response to the control signal and connectable thereto by the calibration switch for rotating the member to establish the reference position when the gyroscope unit is at rest;
means for producing an electrical signal representative of the rate of change of the angular displacement between the gyroscope unit and the container;
means fixed to said gyroscope for producing a first electromagnetic field oriented in a predetermined direction;
means fixed to said container and positioned relative to said first electromagnetic means for producing, relative to said first field, an interacting magnetic field that opposes the angular displacement of said container and gyroscope unit; and
angular displacement electrical signal applying means connected to at least one of the electromagnetic field means and responsive to said electrical signal for inducing said magnetic field interaction whereby the angular displacement of the container and the gyroscope unit is opposed for returning to a stable position relative to each other.

7. A two-degree-of-freedom meridian seeking system including a pendulously supported gyroscope having a predetermined null position relative to a gyroscope container, the gyroscope is pendulously supported for two-degree-freedom-of movement by a suspension band and further including means rotatably mounting the container on a frame for rotation about a vertical axis, which container surrounds the suspended gyroscope unit and also includes means for generating an electrical signal which is representative of an angular displacement relative to a null position between the gyroscope unit and the container, said system comprising:
means responsive to said angular displacement signal for emitting an electrical rate signal representative of the rate of change of angular displacement between said unit and said container;
first magnetic means fixed to the gyroscope unit for supplying a first reference magnetic field perpendicular to the vertical axis;
second magnetic means fixed to the container and interspaced in nontouching relationship from the first magnetic means for supplying a second magnetic field perpendicular to the vertical axis and inductively coupled in substantially a perpendicular direction with the first reference magnetic field when there is, about the vertical axis, no angular displacement of the gyroscope unit away from said null position; and
means responsive to said electrical rate signal for establishing a variable intensity in said second magnetic field which develops a torque when the gyroscope is displaced from the null position tending to rotate the gyroscope unit about the vertical axis and back to said null position.

8. A system in accordance with claim 7 wherein the interspaced magnetic means are a pair of physically spaced toroidal windings with one toroidal winding located within the other.

9. A system in accordance with claim 8 and further comprising:
means for mounting the first toroidal winding of said pair with an axis through its center perpendicular to the vertical axis; and
means for mounting the second toroidal winding of said pair with an axis through its center transverse to the other center axis and also perpendicular to the vertical axis.

* * * * *